US012641208B2

(12) United States Patent
Hoppe et al.

(10) Patent No.: US 12,641,208 B2
(45) Date of Patent: May 26, 2026

(54) SENDER-SIDE GEOMETRIC FUSION OF DEPTH DATA

(71) Applicant: Google LLC, Mountain View, CA (US)

(72) Inventors: Hugues Herve Hoppe, Mercer Island, WA (US); Ricardo Martin Brualla, Seattle, WA (US); Harris Nover, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/250,059

(22) PCT Filed: Oct. 23, 2020

(86) PCT No.: PCT/US2020/070690
§ 371 (c)(1),
(2) Date: Apr. 21, 2023

(87) PCT Pub. No.: WO2022/086579
PCT Pub. Date: Apr. 28, 2022

(65) Prior Publication Data
US 2023/0396751 A1      Dec. 7, 2023

(51) Int. Cl.
*H04N 13/128* (2018.01)
*H04N 13/111* (2018.01)
(52) U.S. Cl.
CPC ......... *H04N 13/128* (2018.05); *H04N 13/111* (2018.05)
(58) Field of Classification Search
CPC .. H04N 13/128; H04N 13/111; H04N 13/268; H04N 13/271; H04N 7/15; H04N 13/122; H04N 13/156; H04N 13/161
See application file for complete search history.

(56) References Cited

U.S. PATENT DOCUMENTS 10,757,410 B1      8/2020   Hoppe et al.
10,818,071 B1      10/2020  Hoppe et al.
(Continued)

FOREIGN PATENT DOCUMENTS

CN      107360354 A      11/2017
CN      107862674 A      3/2018
(Continued)

OTHER PUBLICATIONS

International Search Report and Written Opinion for PCT Application No. PCT/US2020/070690, mailed on Jun. 23, 2021, 15 pages.
(Continued)

*Primary Examiner* — Tracy Y. Li
(74) *Attorney, Agent, or Firm* — Brake Hughes Bellermann LLP

(57) ABSTRACT

Systems and methods are described for utilizing an image processing system with at least one processing device to perform operations including receiving a plurality of depth views of an object, each of the plurality of depth views being captured from a respective viewpoint of the object, each of the plurality of depth views including respective depth data associated with a depth image of the object captured from the respective viewpoint, performing an aggregation operation on the plurality of depth views, and generating an image of the object from a target viewpoint based on the updated depth views, the target viewpoint being different from each of the respective viewpoints from which each of the plurality of depth views are captured.

19 Claims, 7 Drawing Sheets

(56) References Cited

U.S. PATENT DOCUMENTS

| | | | |
|---|---|---|---|
| 2012/0287233 A1* | 11/2012 | Wang | H04N 13/128 |
| | | | 348/42 |
| 2013/0033586 A1 | 2/2013 | Hulyalkar | |
| 2013/0155050 A1 | 6/2013 | Rastogi et al. | |
| 2013/0187918 A1 | 7/2013 | Alj et al. | |
| 2015/0071362 A1* | 3/2015 | Uchiumi | H04N 19/46 |
| | | | 375/240.26 |
| 2015/0092845 A1 | 4/2015 | Grangetto et al. | |
| 2015/0178900 A1 | 6/2015 | Kim et al. | |
| 2015/0249841 A1 | 9/2015 | Yu et al. | |
| 2015/0269737 A1* | 9/2015 | Lam | H04N 13/128 |
| | | | 382/154 |
| 2015/0279118 A1 | 10/2015 | Dou et al. | |
| 2015/0304510 A1 | 10/2015 | Matsutani | |
| 2015/0304665 A1* | 10/2015 | Hannuksela | H04N 19/30 |
| | | | 375/240.02 |
| 2016/0042553 A1 | 2/2016 | Angelidis et al. | |
| 2018/0218510 A1 | 8/2018 | Taguchi et al. | |
| 2018/0352272 A1* | 12/2018 | Breitenfeld | H04N 13/324 |
| 2019/0197786 A1 | 6/2019 | Molyneaux et al. | |
| 2019/0362544 A1 | 11/2019 | Pekelny et al. | |
| 2020/0066027 A1 | 2/2020 | Castaneda | |
| 2020/0137382 A1* | 4/2020 | Zhao | H04N 13/282 |
| 2020/0322542 A1 | 10/2020 | Ricci et al. | |
| 2020/0334894 A1 | 10/2020 | Long et al. | |
| 2021/0065392 A1* | 3/2021 | Bleyer | H04N 13/254 |
| 2021/0264626 A1* | 8/2021 | Liu | G06T 7/13 |

FOREIGN PATENT DOCUMENTS

| | | | |
|---|---|---|---|
| EP | 2327059 B1 | 6/2011 | |
| JP | 2018534699 A | 11/2018 | |
| JP | 2019184308 A | 10/2019 | |
| JP | 2019220902 A | 12/2019 | |
| JP | 2020005202 A | 1/2020 | |
| JP | 2020095717 A | 6/2020 | |
| KR | 20180084805 A | 7/2018 | |
| KR | 20190066658 A | 6/2019 | |
| WO | 2017087088 A1 | 5/2017 | |

OTHER PUBLICATIONS

Wind, "Ray Marching and Signed Distance Functions", 2016, 11 pages.

Lee, et al., "Generation of Multi-View Video Using a Fusion Camera System for 3D Displays", IEEE Transactions on Consumer Electronics, vol. 56, No. 4, Nov. 2010, pp. 2797-2805.

Masuda, "Filling the Signed Distance Field by Fitting Local Quadrics", Proceedings of the 2nd International Symposium on 3D Data Processing, Visualization, and Transmission (3DPVT'04), 2004, 8 pages.

Office Action for Korean Application No. 10-2023-7016765 (with English translation), mailed Apr. 22, 2024, 12 pages.

First Office Action (with English translation) for Chinese Application No. 202080106540.1, mailed Oct. 30, 2024, 17 pages.

Office Action (with English translation) for Japanese Application No. 2023-524720, mailed Oct. 29, 2024, 6 pages.

First Examination Report for Indian Application No. 202347031041, dated Feb. 3, 2026, 10 pages.

* cited by examiner

600

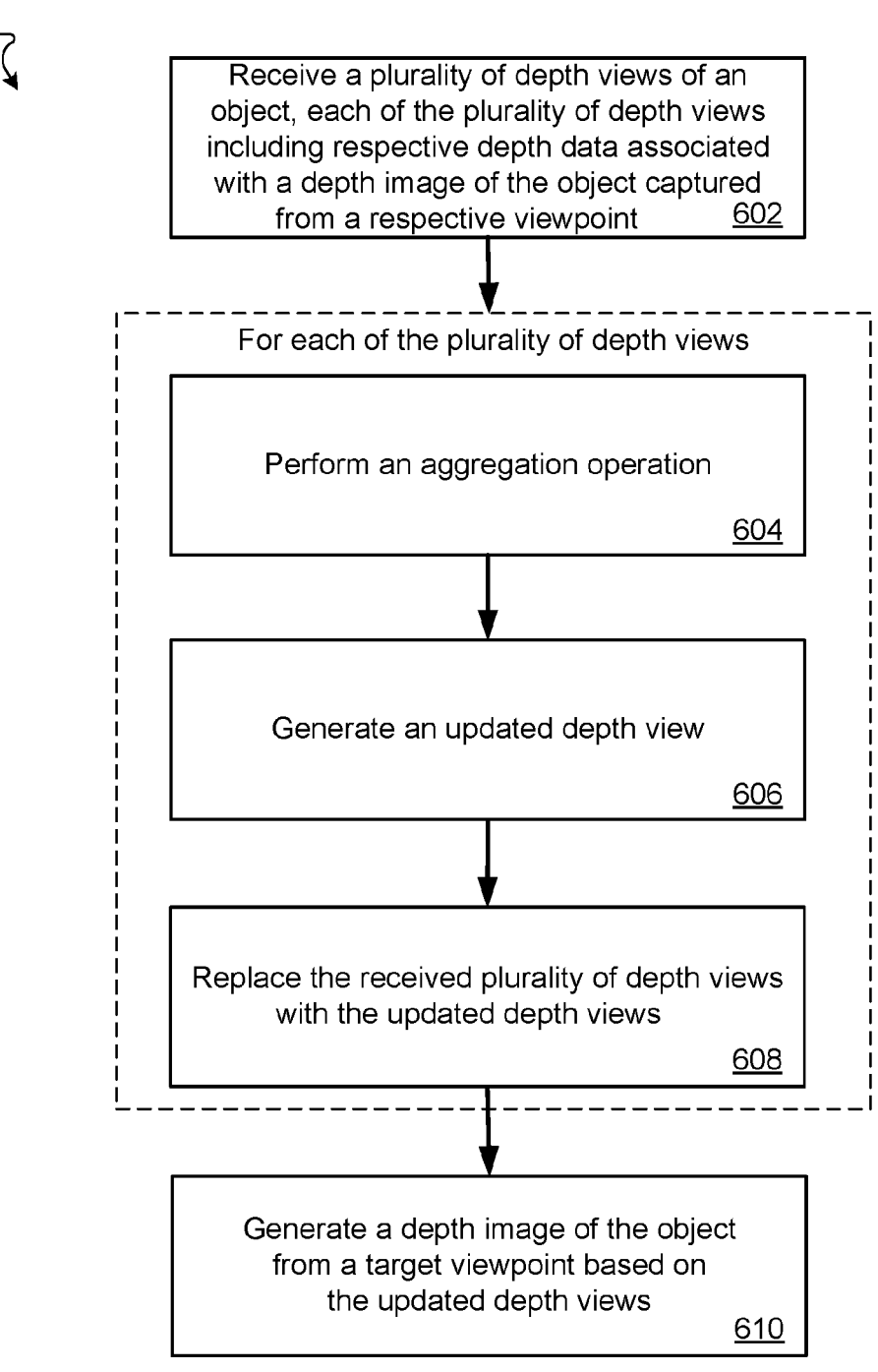

Receive a plurality of depth views of an object, each of the plurality of depth views including respective depth data associated with a depth image of the object captured from a respective viewpoint 602

For each of the plurality of depth views

Perform an aggregation operation

604

Generate an updated depth view

606

Replace the received plurality of depth views with the updated depth views

608

Generate a depth image of the object from a target viewpoint based on the updated depth views 610

FIG. 6

SENDER-SIDE GEOMETRIC FUSION OF DEPTH DATA

CROSS-REFERENCE TO RELATED APPLICATIONS

This application is a 35 U.S.C. § 371 National Phase Entry Application from PCT/US2020/070690, filed on Oct. 23, 2020, entitled "SENDER-SIDE GEOMETRIC FUSION OF DEPTH DATA", the disclosure of which is incorporated herein by reference in its entirety. This application relates to U.S. application Ser. No. 16/523,247, filed on Jul. 26, 2019, now issued as U.S. Pat. No. 10,757,410, entitled "SPA-TIALLY ADAPTIVE VIDEO COMPRESSION FOR MULTIPLE STREAMS OF COLOR AND DEPTH", and also relates to U.S. application Ser. No. 16/523,702, filed on Jul. 26, 2019, now issued as U.S. Pat. No. 10,818,071, entitled "IMAGE-BASED GEOMETRIC FUSION OF MULTIPLE DEPTH IMAGES USING RAY CASTING", the contents of which are incorporated herein by reference in their entireties.

TECHNICAL FIELD

This description generally relates to fusion of depth data.

BACKGROUND

Computing devices may be configured to generate images of objects that may be compressed and transmitted over a network using a compression scheme. For example, Multi-view Video Coding (MVC) may be used to compress stereoscopic videos to efficiently encode video sequences captured simultaneously from multiple camera angles in a single video stream. MVC compression schemes maintain all artifacts of each captured view including noise, missing data, etc. Such conventional approaches preserve the original views (e.g., color and depth) and generally use methods to increase or decrease video quality in order to reduce a bitrate for transmitting the images of objects over the network.

SUMMARY

A system (e.g., an image processing system) of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, systems and methods are described for a computer-implemented method utilizing an image processing system with at least one processing device to perform operations including receiving a plurality of depth views of an object where each of the plurality of depth views being captured from a respective viewpoint of the object and where each of the plurality of depth views including respective depth data associated with a depth image of the object captured from the respective viewpoint. The method may further include performing an aggregation operation on the plurality of depth views where the aggregation operation includes generating an updated depth view corresponding with each of the plurality of depth views, each updated depth view being based on the respective viewpoint, and representing portions of the respective depth data from each of the remaining of the plurality of depth views of the object, and replacing each of the plurality of depth views with the corresponding updated depth view. The method may further include generating an image of the object from a target viewpoint based on the updated depth views where the target viewpoint being different from each of the respective viewpoints from which each of the plurality of depth views are captured.

These and other aspects can include one or more of the following, alone or in combination. According to some aspects, the methods, systems, and computer-readable mediums claimed herein may include one or more (e.g., all) of the following features (or any combination thereof).

In some implementations, performing the aggregation operation results in generating missing data associated with at least one of the received plurality of depth views of the object. In some implementations, the missing data includes occluded regions associated with at least one of the received plurality of depth views of the object. In some implementations, performing the aggregation operation results in a reduction of noise associated with at least one of the received plurality of depth views of the object.

In some implementations, the aggregation operation is a geometric fusion of the plurality of received depth views to generate the updated depth views where the aggregation operation being performed as a pre-process responsive to a request to transmit the plurality of depth views over a network and where the pre-process further includes video compression of each updated depth view. In some implementations, the target viewpoint is selected to synthesize a previously uncaptured image of the object. In some implementations, the image processing system is a telepresence system configured to use the updated depth views to synthesize images from a plurality of target viewpoints. In some implementations, the plurality of depth views represent a plurality of depth maps corresponding to captured images of the object and generating and replacing the plurality of depth maps with the updated depth maps improves a temporal coherence of the generated depth image of the object from the target viewpoint.

Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

FIG. 6 is a flow chart diagramming one example of a process to perform sender-side geometric fusion for generating image content, according to implementations described throughout this disclosure.

Like reference symbols in the various drawings indicate like elements.

DETAILED DESCRIPTION

Figure 1:
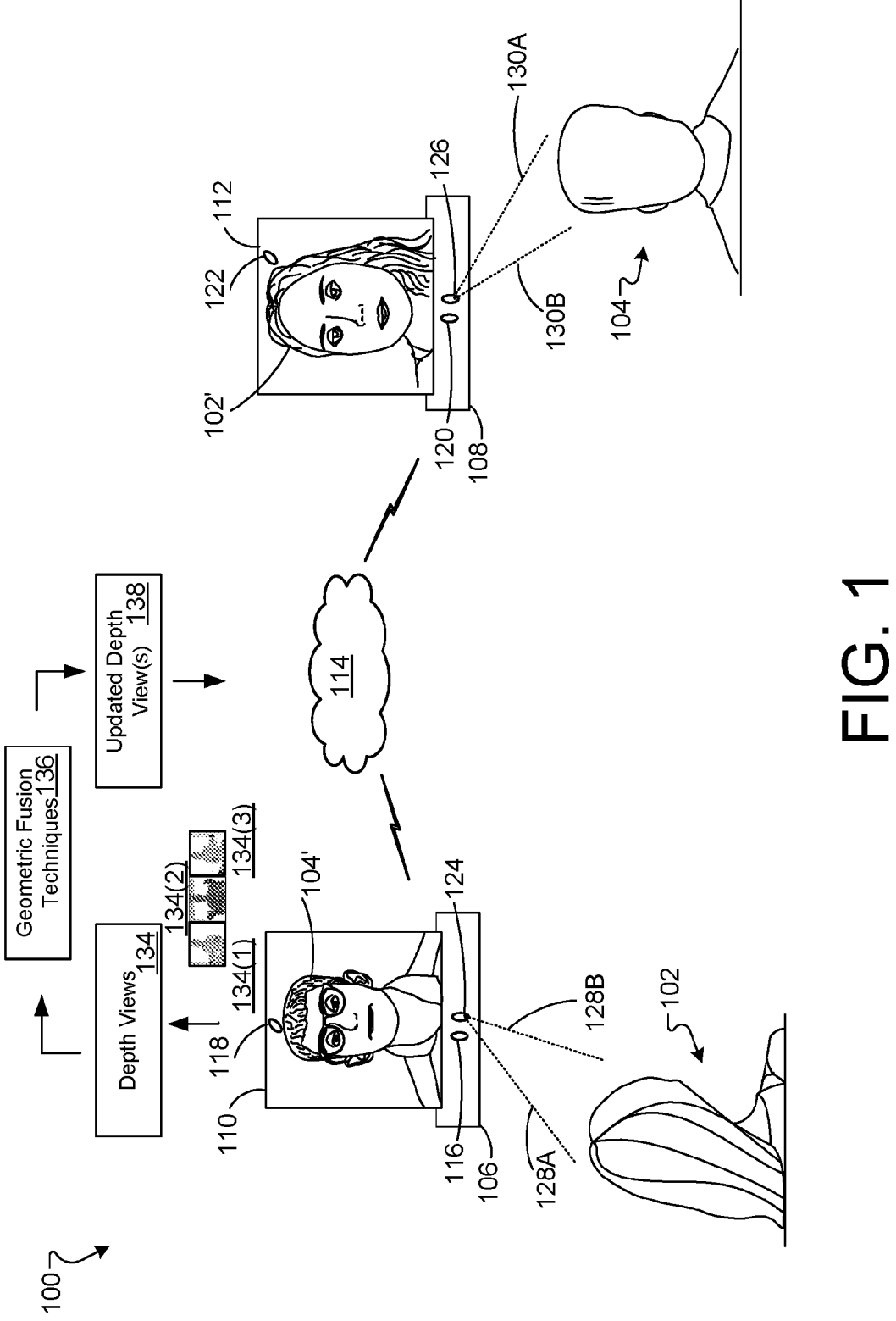
FIG. 1 is a block diagram illustrating an example 3D content system for generating and displaying synthesized content on a display device, according to implementations described throughout this disclosure.

In general, this document describes geometric fusion techniques that may be applied to objects captured by a number of cameras. The geometric fusion techniques may be used to replace multiple views of depth image data (e.g., captured depth views of an object) with updated (e.g., calculated) views of depth image data. The updated depth views may be generated as views of the object that contain the depth data from the captured depth views and additionally contain image and/or depth information from each of any other available captured depth views of the object. One or more of the updated depth views may be used to synthesize additional (and new) views of the object by utilizing the stored depth image data and image and/or depth information associated with multiple other views of the object.

The depth image data may be fused using any number of algorithms to replace each (input) depth view by a new depth view that incorporates depth data information from several other depth views. The input depth view may represent depth views before being modified by the algorithms described herein. The algorithms described herein can replace each (input) depth view by a new depth view that incorporates depth data information from any number of other (input) depth views to complete missing data and/or to reduce noise in the images. As used herein, a depth view represents a distance between a particular captured object and an image capture device associated with the image processing system described herein. An updated depth view may begin with a depth view and modify, merge, add, and/or remove data from the depth view in order to generate the updated depth view.

In some implementations, the updated depth views may be generated for use in synthesizing novel (e.g., unseen) views of objects. For example, this document includes examples pertaining to generating novel images of objects (e.g., images captured of a user in a telepresence session, virtual content captured by cameras, physical objects captured by cameras, etc.). As used herein, novel (e.g., unseen, new) views may include image content and/or video content that has been interpreted (e.g., synthesized, interpolated, modeled, etc.) based on one or more frames of camera-captured image content (e.g., objects, depths, lighting, etc.) and/or video content. The interpretation of the camera-captured image content and/or video content may be used in combination with the techniques described herein to create unseen 3D versions and views (e.g., poses, angles, etc.) of the captured image content and/or video content, for example.

One example technique to generate unseen 3D images may include a sender-side geometric fusion that is applied to a set of depth views captured at a sender system. The sender-side geometric fusion may result in generation of the updated depth views which include depth data from each of any number of captured views. The fused depth views may be compressed and sent across a network. At a receiver system, a decompression process may be performed on the fused depth views and a geometric fusion technique can be again performed to synthesize the novel content for rendering at the receiver system. Thus, geometric fusion may be performed twice; once to each input (e.g., captured) depth view (on the sender system) before transmission, and once to a final synthesized view when merging the received (sender-side-fused) depth views.

Examples are described that utilize merging (e.g., fusing) of data across particular depth views to improve compressibility of the data, thus reducing the network bandwidth (e.g., number of bits per second) associated with transmitting depth data from a sender location to a receiver location. In some implementations, the systems and methods described herein can utilize geometric fusion algorithms to fuse multiple views of depth image data at a sender location before transmitting the fused depth image data to a receiver side in order to reduce network bandwidth resources when transmitting such data.

In some implementations, the systems and methods described herein can reduce the network bandwidth (e.g., a bitrate) for transmitting particular depth views from a sender client to a receiver client because the particular depth views may be used to generate new depth views by merging (e.g., fusing) information across the particular depth views to reduce the magnitude of noise and/or to fill-in an occluded regions, which in turn may reduce the bitrate of transmitting such content. In some implementations, the occluded regions of missing data may be filled in using data from other depth views.

In some implementations, the techniques described herein can be used to synthesize images that appear accurate and realistic for display on a screen of a 3D display used in a multi-way 3D video conference, for example. The systems and methods described herein can use such techniques to generate and display accurate and realistic views (e.g., image content, video content) of 3D objects (e.g., users, virtual objects, physical objects, etc.). The views include unseen views that may, conventionally, be difficult to depict in a 3D manner.

In some implementations, the techniques described herein may be used by virtual assistant devices or other intelligent agents that may perform image processing to recognize objects, recreate objects and/or depth, and or generate synthesized images from such objects using the techniques described herein.

A technical problem involved in the above-described conventional approaches to the network transmission bitrate is that such approaches are not effective in the presence of multiple depth views. For example, there is substantial overhead present in the redundancy of the depth views, i.e., the fact that a point in the environment is often visible in several of the depth views.

In contrast to the conventional approaches to solving the above-described technical problem, a technical solution provided by the systems and methods described herein includes computing a geometrically-fused depth view (i.e., an updated depth view) for each captured depth view based on a similarity between the depth image surface normal and the view direction associated with the depth view.

A technical advantage of the above-described technical solution is that the technical solution allows for more efficient compression of video images with multiple depth views because sender-side fusion techniques use information from each depth view to modify and/or improve each of the other depth views (i.e., by filling in missing or undefined regions and by reducing the magnitude of the noise associated with the views. The resulting depth views remain redundant with respect to each other, but the resulting depth views are more compressible than conventional depth views. The multiple depth views are transmitted over the network using a lower bitrate (a better compressed representation) because they are modified in the sender-side system using geometric fusion. In some implementations, conventional techniques (including MVC) may then be applied subsequently (i.e., after the sender-side geometric fusion) to reduce this redundancy.

FIG. 1 is a block diagram illustrating an example 3D content system 100 for generating and displaying content on a stereoscopic display device, according to implementations described throughout this disclosure. The 3D content system 100 can be used by multiple users to, for example, conduct video conference communications in 3D (e.g., telepresence sessions). In general, the system of FIG. 1 may be used to capture video and/or images of users during a 3D video conference and use the systems and techniques described herein to capture multiple color views and depth views at a sender location (e.g., 3D system 106), perform geometric fusion techniques on the captured depth views to generate updated depth views and transmit such views to a receiver location, where these views are used to synthesize novel view(s) for an observer.

System 100 may benefit from the use of the techniques described herein because such techniques can generate and display novel views of poses, expressions, and user image portions, within a video conference for example, that accurately represent a 3D depth adjusted view of objects and/or users in the video conference. The novel views (e.g., images) may be used with the techniques described herein to generate accurate texture, depth, and imagery of a user and/or object that may be displayed to another user in a 3D manner via system 100, for example.

As shown in FIG. 1, the 3D content system 100 is being used by a first user 102 and a second user 104. For example, the users 102 and 104 are using the 3D content system 100 to engage in a 3D telepresence session. In such an example, the 3D content system 100 can allow each of the users 102 and 104 to see a highly realistic and visually congruent representation of the other, thereby facilitating the users to interact in a manner similar to being in the physical presence of each other.

Each user 102, 104 can have a corresponding 3D system. Here, the user 102 has a 3D system 106 and the user 104 has a 3D system 108. The 3D systems 106, 108 can provide functionality relating to 3D content, including, but not limited to capturing images for 3D display, processing and presenting image information, and processing and presenting audio information. The 3D system 106 and/or 3D system 108 can constitute a collection of sensing devices integrated as one unit. The 3D system 106 and/or 3D system 108 can include some or all components described with reference to FIGS. 2 and 7.

The 3D content system 100 can include one or more 3D displays. Here, a 3D display 110 is provided for the 3D system 106, and a 3D display 112 is provided for the 3D system 108. The 3D displays 110, 112 can use any of multiple types of 3D display technology to provide an autostereoscopic view for the respective viewer (here, the user 102 or user 104, for example). In some implementations, the 3D displays 110, 112 may be a standalone unit (e.g., self-supported or suspended on a wall). In some implementations, the 3D displays 110, 112 can include or have access to wearable technology (e.g., controllers, a head-mounted display, etc.). In some implementations, displays 110, 112 may be 2D displays.

In general, displays, such as displays 110, 112 can provide imagery that approximates the 3D optical characteristics of physical objects in the real world without the use of a head-mounted display (HMD) device. In general, the displays described herein include flat panel displays, lenticular lenses (e.g., microlens arrays), and/or parallax barriers to redirect images to a number of different viewing regions associated with the display.

In some implementations, the displays 110, 112 can include a high-resolution and glasses-free lenticular 3D display. For example, displays 110, 112 can include a microlens array (not shown) that includes a plurality of lenses (e.g., microlenses) with a glass spacer coupled (e.g., bonded) to the microlenses of the display. The microlenses may be designed such that, from a selected viewing position, a left eye of a user of the display may view a first set of pixels while the right eye of the user may view a second set of pixels (e.g., where the second set of pixels is mutually exclusive to the first set of pixels).

In some example displays, there may be a single location that provides a 3D view of image content (e.g., users, objects, etc.) provided by such displays. A user may be seated in the single location to experience proper parallax, minimal distortion, and realistic 3D images. If the user moves to a different physical location (or changes a head position or eye gaze position), the image content (e.g., the user, objects worn by the user, and/or other objects) may begin to appear less realistic, 2D, and/or distorted. The systems and techniques described herein may reconfigure the image content projected from the display to ensure that the user can move around, but still experience proper parallax and depth, low rates of distortion, and realistic 3D images in real time. Thus, the systems and techniques described herein provide the advantage of maintaining or improving provided 3D image content and objects for display to a user regardless of any user movement that occurs while the user is viewing the 3D display.

As shown in FIG. 1, the 3D content system 100 can be connected to one or more networks. Here, a network 114 is connected to the 3D system 106 and to the 3D system 108. The network 114 can be a publicly available network (e.g., the Internet), or a private network, to name just two examples. The network 114 can be wired, or wireless, or a combination of the two. The network 114 can include, or make use of, one or more other devices or systems, including, but not limited to, one or more servers (not shown).

The 3D systems 106, 108 can include multiple components relating to the capture, processing, transmission or reception of 3D information, and/or to the presentation of 3D content. The 3D systems 106, 108 can include one or more cameras for capturing image content for images to be included in a 3D presentation. Here, the 3D system 106 includes cameras 116 and 118. For example, the camera 116 and/or camera 118 can be disposed essentially within a housing of the 3D system 106, so that an objective or lens of the respective camera 116 and/or 118 captured image content by way of one or more openings in the housing. In some implementations, the camera 116 and/or 118 can be separate from the housing, such as in form of a standalone device (e.g., with a wired and/or wireless connection to the 3D system 106). The cameras 116 and 118 can be positioned and/or oriented so as to capture a sufficiently representative view of a user (e.g., user 102). While the cameras 116 and 118 generally will not obscure the view of the 3D display 110 for the user 102, the placement of the cameras 116 and 118 can be arbitrarily selected. For example, one of the cameras 116, 118 can be positioned somewhere above the face of the user 102 and the other can be positioned somewhere below the face. For example, one of the cameras 116, 118 can be positioned somewhere to the right of the face of the user 102 and the other can be positioned somewhere to the left of the face. The 3D system 108 can in an analogous way include cameras 120 and 122, for example. Additional cameras are possible. For example, a third camera may be placed near or behind display 110.

In some implementations, the 3D systems 106, 108 can include one or more depth sensors to capture depth data to be used in a 3D presentation. Such depth sensors can be considered part of a depth capturing component in the 3D content system 100 to be used for characterizing the scenes captured by the 3D systems 106 and/or 108 in order to correctly represent the scenes on a 3D display. In addition, the system can track the position and orientation of the viewer's head, so that the 3D presentation can be rendered with the appearance corresponding to the viewer's current point of view. Here, the 3D system 106 includes a depth sensor 124. In an analogous way, the 3D system 108 can include a depth sensor 126. Any of multiple types of depth sensing or depth capture can be used for generating depth data.

In some implementations, an assisted-stereo depth capture is performed. The scene can be illuminated using dots of lights, and stereo-matching can be performed between two respective cameras, for example. This illumination can be done using waves of a selected wavelength or range of wavelengths. For example, infrared (IR) light can be used. In some implementations, depth sensors may not be utilized when generating views on 2D devices, for example.

Depth data can include or be based on any information regarding a scene that reflects the distance between a depth sensor (e.g., the depth sensor 124) and an object in the scene. The depth data reflects, for content in an image corresponding to an object in the scene, the distance (or depth) to the object. For example, the spatial relationship between the camera(s) and the depth sensor can be known, and can be used for correlating the images from the camera(s) with signals from the depth sensor to generate depth data for the images.

The images captured by the 3D content system 100 can be processed and thereafter displayed as a 3D presentation. As depicted in the example of FIG. 1, 3D image 104' of user 104 is presented on the 3D display 110. As such, the user 102 can perceive the 3D image 104' as a 3D representation of the user 104, who may be remotely located from the user 102. The 3D image 102' is presented on the 3D display 112. As such, the user 104 can perceive the 3D image 102' as a 3D representation of the user 102.

The 3D content system 100 can allow participants (e.g., the users 102, 104) to engage in audio communication with each other and/or others. In some implementations, the 3D system 106 includes a speaker and microphone (not shown). For example, the 3D system 108 can similarly include a speaker and a microphone. As such, the 3D content system 100 can allow the users 102 and 104 to engage in a 3D telepresence session with each other and/or others. In general, the systems and techniques described herein may function with system 100 to generate image content and/or video content for display amongst users of system 100.

Generating image content to be displayed on the telepresence system 100 may include the use of any number of input depth views 134 (e.g., obtained from input images 201). For example, system 106 can capture images 201, retrieve depth views 134, and process the views 134 (or send the views to be processed at a server) using geometric fusion techniques 136 in order to generate updated depth views 138. The updated depth views 138 represent views that replace each original depth view from the captured depth views 134 by a recomputed depth view that incorporates information from the other depth views corresponding to the captured depth views 134. By recomputing the depth view on the sender side, the system 100 may, in effect, reduce the bitrate of transmitting the depth views from a sender client (e.g., 3D system 106) to a receiver client (e.g., 3D system 108) by merging information across the views 134 so as to reduce the magnitude of noise as well as fill in any detected occluded regions.

Figure 2:
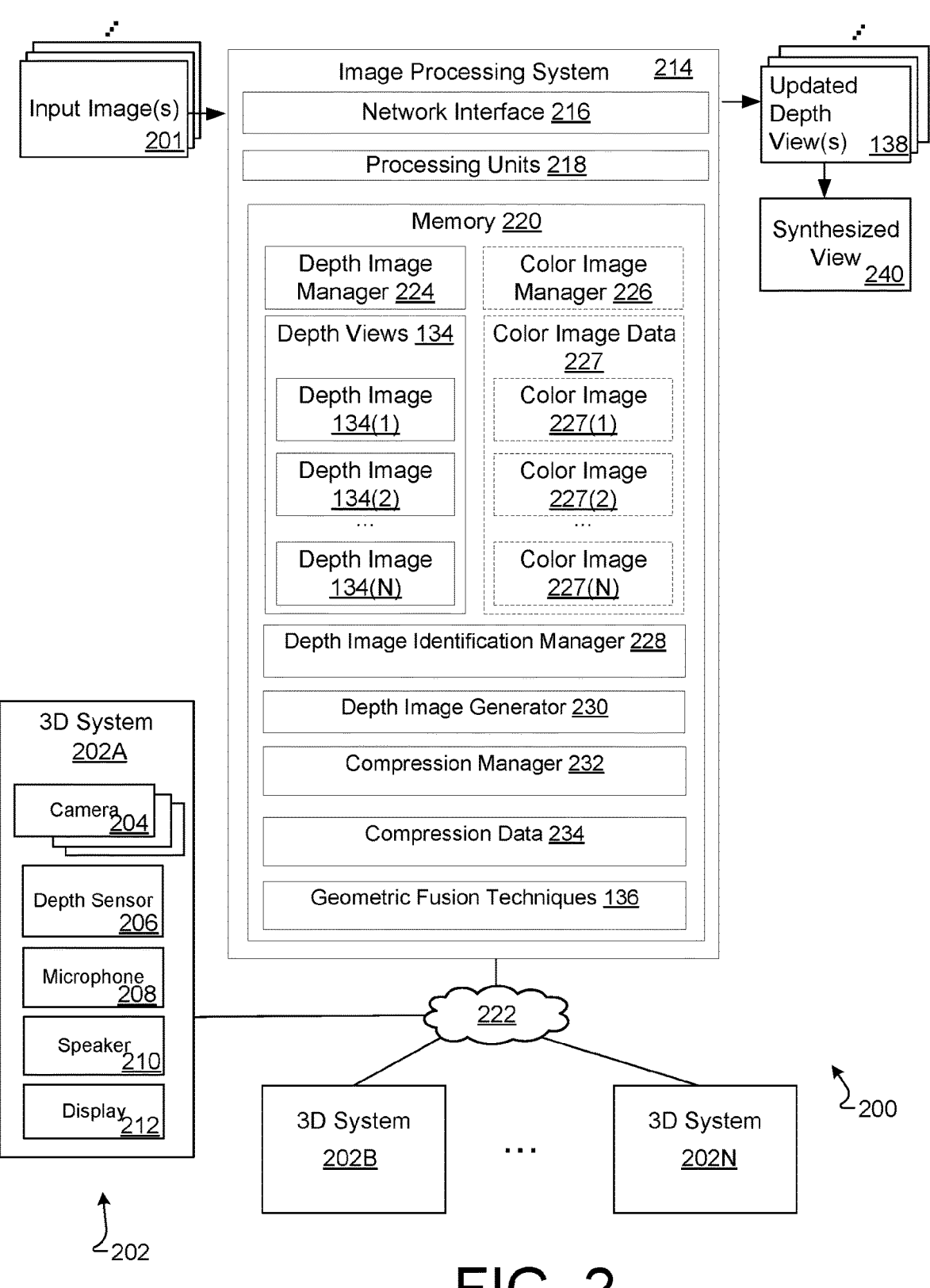
FIG. 2 is a block diagram of an example system for generating depth views and for synthesizing content for rendering on a display device, according to implementations described throughout this disclosure.

FIG. 2 is a block diagram of an example system for generating depth views and for synthesizing content for rendering on a display device, according to implementations described throughout this disclosure. The system 200 can serve as, or be included within, one or more implementations described herein, and/or can be used to perform the operation(s) of one or more examples of synthesizing, processing, modeling, or presentation of the views representing image data described herein. The overall system 200 and/or one or more of its individual components, can be implemented according to one or more examples described herein.

System 200 may be configured to render computer graphic objects at a specified view given multiple, existing views. For example, given several image views (e.g., input images 201) captured from cameras about a scene that includes such computer graphic objects, a goal may be to synthesize a new (e.g., novel) view of the scene from a different viewpoint. The scene can be either real, in which case the views are captured using physical color and depth sensors, or synthetic, in which case the views are captured using rendering algorithms such as rasterization or ray tracing. For a real scene, there exist many depth-sensing technologies, such as time-of-flight sensors, structured-light-based sensors, and stereo or multi-view stereo algorithms, any and all of which may be employed by system 200. Such technologies may involve visible or infrared sensors with passive or active illumination patterns, where the patterns may be temporally varying, any and all of which may be employed by system 200.

The system 200 may include one or more 3D systems 202. In the depicted example, 3D systems 202A, 202B through 202N are shown, where the index N indicates an arbitrary number. The 3D system 202 can provide for capturing of visual and audio information for a 2D or a 3D presentation, and forward the 2D or 3D information for processing. Such information can include images of a scene, depth data about the scene, and audio from the scene. For example, the 3D system 202 can serve as, or be included within, the system 106 and 2D/3D display 110 (FIG. 1).

The system 200 may include multiple cameras, as indicated by cameras 204. Any type of light-sensing technology can be used for capturing images, such as the types of images sensors used in common digital cameras. The cameras 204 can be of the same type or different types. Camera locations may be placed within any location on a 3D system such as system 106, for example. In some implementations, cameras (e.g., camera sensors) may be located in a periphery of a display 212 (e.g., 112) and such cameras may be used to synthesize novel views from near the center of the display 212 (e.g., 112).

The system 202A includes a depth sensor 206. In some implementations, the depth sensor 206 operates by way of projecting IR signals onto the scene and detecting the responding signals. For example, the depth sensor 206 can generate and/or detect the beams 128A-B and/or 130A-B. In some implementations, the depth sensor 206 is an optional component, for example, in 2D video conferencing applications that do not utilize depth sensing. The system 202A also includes at least one microphone 208 and a speaker 210. In some implementations, the microphone 208 and speaker 210 may be part of system 106.

The system 202 additionally includes a 3D display 212 that can present 3D images. In some implementations, the 3D display 212 can be a standalone display and in some other implementations the 3D display 212. In some implementations, the 3D display 212 operates using parallax barrier technology. For example, a parallax barrier can include parallel vertical stripes of an essentially non-transparent material (e.g., an opaque film) that are placed between the screen and the viewer. Because of the parallax between the respective eyes of the viewer, different portions of the screen (e.g., different pixels) are viewed by the respective left and right eyes. In some implementations, the 3D display 212 operates using lenticular lenses. For example, alternating rows of lenses can be placed in front of the screen, the rows aiming light from the screen toward the viewer's left and right eyes, respectively.

The system 200 includes an image processing system 214 that can perform certain tasks of data processing, data modeling, depth image management and modifications, compression management, data coordination, and/or data transmission. The system 214 may represent a server or client computing system having any or all of the components described with reference to FIG. 7 and/or 3D system 202.

In some implementations, the system 214 may be configured to render images of objects. The system 214 includes a network interface 216, one or more processing units 218 and memory 220. The network interface 216 includes, for example, Ethernet adaptors, and the like, for converting electronic and/or optical signals received from a network 222, for example, to electronic form for use by the system 214. The set of processing units 218 include one or more processing chips and/or assemblies. The memory 220 includes both volatile memory (e.g., RAM) and non-volatile memory, such as one or more ROMs, disk drives, solid state drives, and the like. The set of processing units 218 and the memory 220 together form control circuitry, which is configured and arranged to carry out various methods and functions as described herein.

In some implementations, one or more of the components of the system 214 can include or have access to processors (e.g., processing units 218) configured to process instructions stored in the memory 220. Such instructions may, for example, be carried out by a depth image manager 224, an optional color image manager 226, a depth image identification manager 228, a depth image generator 230, and a compression manager 232. Further, as illustrated in FIG. 2, the memory 220 is configured to store various data, which is described with respect to the respective managers that use such data.

The depth image manager 224 is configured to receive depth image data (e.g., depth views 134). The depth image manager 224 receives the depth views 134, in some implementations, over a network 222 via the network interface 216. In some implementations, the depth image manager 224 receives the depth views 134 from a local storage device, e.g., a hard drive, a flash drive, a storage disk, or the like.

The depth views 134 represent a plurality of depth images (e.g., depth maps) shown as depth images 134(1) . . . 134(N) of an object (e.g., a virtual object, a physical object, a user, etc.). An example of a depth image may be seen in FIG. 1, for example, depth image 134(1). Each depth image represents a map of distances—or depths—along a line from at least one camera to pixels on the surface of the object. The at least one camera is oriented with respect to the object at an angle indicated by a viewpoint from which the depth image is captured. In the examples described herein, there are three given depth images of an object to be fused into a new depth image captured from a specified viewpoint. In some implementations, there may be fewer or more than three depth images to be fused.

In some implementations, the system 214 may be optionally configured to compress color images. The color image manager 226 is configured to receive color image data 227. The color image manager 226 receives the color image data 227, in some implementations, over network 222 via the network interface 216. In some implementations, the color image manager 226 receives the color image data 227 from a local storage device, e.g., a hard drive, a flash drive, a storage disk, and so on.

The color image data 227 represents a plurality of color images 227(1) . . . 227(N) of an object. Each depth image, e.g., color image 227(1), represents a map of distances—or depths—along a line from at least one camera to pixels on the surface of the object. For example, each pixel value in a depth image encodes the position of the closest object surface intersected by a line (e.g., a ray) from the camera center through the pixel. This encoding can be implemented as either distance or depth. Distance measures the length along the line (ray) through each pixel from the camera center to the surface point. Depth measures the coordinate of surface point along the camera principal axis (commonly called the z-axis of the depth camera). The at least one camera is oriented with respect to the object at an angle indicated by a viewpoint from which the depth image is captured.

The depth image identification manager 228 is configured to identify a depth image of the plurality of depth images associated with that color image. In some implementations, the depth image identification manager 228 identifies, as the depth image associated with a color image (e.g., color image 227(1)), a depth image (e.g., depth view 134(1)) having a center of projection closest to a center of projection of the color image 227(1).

In some implementations, the viewpoint may be received at system 214. The viewpoint data represents an orientation of a target viewpoint from which new depth image data can be generated. In some implementations, the viewpoint data includes a camera matrix. In some implementations, the camera matrix is a 3×4 matrix representing a mapping from 3D camera coordinates to 2D image coordinates.

The depth image generator 230 may be a manager that is configured to generate a depth image of the object captured from a target viewpoint represented by viewpoint data from which a particular depth image may be captured.

In some implementations, a ray casting manager (not shown) may be used with system 200 to generate ray data based on a 3D scene represented by an image as seen from the perspective of the target viewpoint. For example, the ray casting manager can cast a respective ray for each pixel of the image. In some implementations, the ray casting manager casts rays using a parallel process, i.e., using multiple threads and/or processors simultaneously. In such implementations, operations on each ray that has been cast are performed in parallel similarly. In some implementations, the ray casting manager casts the rays in parallel across the pixels of the image using warps. In some implementations, the ray casting manager casts the rays in parallel across the pixels of the image using an OpenGL fragment shader.

Ray data (not shown) represents rays used to form an image of a 3D scene including the object. Each ray represented by the ray data is associated with a pixel of the image. The rays represented by the ray data emanate from a viewpoint origin (e.g., a camera) to a pixel of the image. In some implementations, a signed distance value (SDV) manager (not shown) may be part of system 200 and may be configured to generate SDV data by computing SDVs along each ray at various positions along that ray for each of the depth images. To accomplish this, in some implementations, the SDV manager is configured to step along the ray iteratively until a stopping condition is satisfied. In some implementations, the stopping condition is that the location of the next step crosses a surface of the object associated with a depth image. In some implementations, the step size along the ray is proportional to an absolute value of a distance between a current location along the ray of a step and a surface of the object. In this way, the steps become finer as the locations approach the object surface associated with the viewpoint a depth image. In some implementations, if the absolute value of a SDV is greater than some truncation threshold value, then that SDV is replaced by a specified value. In some implementations, the specified value is undefined. In some implementations, the SDV data 162 represents SDVs (signed distance values) along each ray for each depth image. As a convention, the sign of the SDVs herein is positive for positions along a ray between the viewpoint origin and the surface associated with a viewpoint and negative for positions along a ray beyond the surface.

In an example, a point along the ray is expressed as $p=o+\alpha v$, where o denotes the target viewpoint, v is the unit view direction of the ray, and the scalar $\alpha$ encodes parametric location along the ray. Given a ray point p, for each depth image j, we transform p into the camera space of the depth image, compute the perspective projection to determine the pixel coordinates of point p in the camera image, and sample the stored depth value. In some implementations, a weight value is also stored. The depth value is subtracted from the z coordinate of the camera-space point to obtain a signed-distance value $s_j$. Note, as mentioned above, that $s_j$ is positive if the point p lies in front of the frontmost surface visible from the depth camera, or negative otherwise.

A root-finding manager (not shown) is configured to perform a root-finding operation to produce a root of the aggregated SDV along each of the rays. In some implementations, the root-finding operation includes determining a location at which the aggregated SDV changes sign, e.g., from positive to negative, and performing a binary search operation to locate the root (e.g., where the aggregated SDV along the ray is zero or some other constant). Root location data may represent the roots of the aggregated SDV along each ray as determined via the root-finding operation described above. The depth image generator 230, along these lines, generates an object surface based on the roots represented by the root location data. In some implementations, the depth image generator 230 performs an interpolation operation to produce a continuous surface from the discrete roots.

The compression manager 232 is configured to perform a compression operation on each depth view according to determined depth views to produce the compression data 234. The compression data 234 is transmitted to a receiver, where it is decompressed (decoded) and fused together to create a synthesized view 240.

Conventional video systems achieve real-time transmission of video by exploiting hardware video encoding and decoding of multiple streams of video, for example three depth views and four color views. These views are fused in a receiver to create low-latency left/right views based on the receiver's tracked eyes. For such systems, a general problem is reducing a network transmission bitrate required by the video streams, in particular by the plurality of color views. Conventional approaches to reducing the network transmission bitrate includes selectively increasing or decreasing the quality of the video in particular spatial regions of the frame. For example, in a video conferencing scenario, such conventional approaches may be used to keep greater detail on a user's face while allowing other parts of the frame to have reduced quality. Other conventional approaches attempt to preserve the quality of each of multiple color images; this is done by adapting the quality of view images (e.g., by compressing the compression quality spatially) with the aim of allowing a high-quality rendering of the final object as a combination of the compressed views.

The system 200 may perform geometric fusion techniques 136. The techniques 136 may be used in the context of computer graphics rendering from existing views. For example, given several depth images (and/or color images) captured from cameras about a scene, it is desired to synthesize a new view of the scene from a different viewpoint. The scene can be either physical (in which case the views are captured using physical color and depth sensors) or synthetic (in which case the views are captured using rendering algorithms such as rasterization or ray tracing). For a physical scene, there exist many depth-sensing technologies, such as time-of-flight sensors, structured-light-based sensors, and stereo (or multi-view stereo) algorithms. These technologies may involve visible or infrared sensors, optionally with passive or active illumination patterns, where the patterns may be temporally varying.

The system 200 may merge depth information and/or other image information from a plurality of views into a consistent representation of a scene, so that the reconstructed scene can be rendered with correct inter-surface occlusion and parallax from the specified viewpoint. In a physical scene, both the depth and color sensors create noisy data. Additionally, the acquired depth images can have large errors, particularly near depth discontinuities such as silhouettes. Therefore, it is desirable to adaptively vary the importance given to the different views when merging them, for example, giving less preference to views that see a scene surface obliquely if it is visible in a more head-on direction from another view. The geometric fusion techniques used by system 200 may include merging multiple depth views into a consistent representation from a particular view (i.e., as represented using a new depth image from that view). Thus, geometry fusion can be performed on the sender-side to merge all depth views to generate new depth images for each original depth view. In addition, the geometric fusion techniques can be performed on the receiver-side to merge all depth views to generate depth images from novel views (e.g., for a left eye and a right eye).

In some implementations, geometric fusion techniques may include techniques that aggregate information together based on a particular geometric shape. In some implementations, the geometric fusion techniques may use multiple sets of overlapping surface measurements (e.g., as found in depth views/maps) to generate updated depth views/maps that include data from other of the depth views/maps with the overlapping surface measurements.

In operation, systems with system 200 may perform a sender-side geometric fusion as applied to a set of views captured at a sender system. The sender-side geometric fusion may result in generation of the updated views which include depth data from each of the captured views. At a receiver system, a geometric fusion technique can be again performed to synthesize the novel content for rendering at the receiver system. Thus, geometric fusion may be performed twice; once to each input (e.g., captured) depth view (on the sender system) before transmission, and once to a final synthesized view when merging the received (sender-side-fused) depth views.

The exemplary components above are described as being implemented in the system 214, which can communicate with one or more of the 3D systems 202 by way of the network 222 (which can be similar or identical to the network 114 in FIG. 1). In some implementations, the components depicted in memory 220 can instead or in addition be implemented in some or all of the 3D systems 202. For example, the above-described methods and/or processing can be performed by the system that originates the 3D information before forwarding the 3D information to one or more receiving systems.

The system 200 is an example of a system that includes or has access to image data from cameras (e.g., the cameras 204), a depth sensor (e.g., the depth sensor 206), and a 3D content generator (e.g., the depth image generator 230) having a processor executing instructions stored in a memory 220. Such instructions can cause the processor to identify, using depth data included in 3D information (e.g., by way of a depth processing component), image content in images of a scene included in the 3D information. The processor can generate modified depth views (e.g., updated depth views 138), as described in FIG. 6 below, which may be provided to a display 212 to properly depict the synthesized view 240, for example.

The updated depth views 138 represent views that replace each original depth view from the captured depth views 134 by a recomputed depth view that incorporates information from the other depth views corresponding to the captured depth views 134. Recomputing the depth view on the sender side may include merging information across the depth views 134 so as to reduce the magnitude of noise as well as fill in any detected occluded regions, as described in further detail below.

The synthesized view 240 represents a 3D stereoscopic image of a particular object (e.g., a user image 104') with proper parallax and viewing configuration for both eyes associated with the user accessing a display (e.g., display 212) based at least in part on a sender-side geometric fusion, as described herein.

In some implementations, processors 218 may include (or communicate with) a graphics processing unit (GPU). In operation, the processors may include (or have access to memory, storage, and other processors (e.g., a CPU)). To facilitate graphics and image generation, the processors may communicate with the GPU to display images on a display device (e.g., display device 212). The CPU and the GPU may be connected through a high speed bus, such as PCI, AGP, or PCI-Express. The GPU may be connected to the display through another high speed interface such as HDMI, DVI, or DisplayPort. In general, the GPU may render image content in a pixel form. The display device 212 may receive image content from the GPU and may display the image content on a display screen.

Figures 3A, 3B, 3C, 3D:
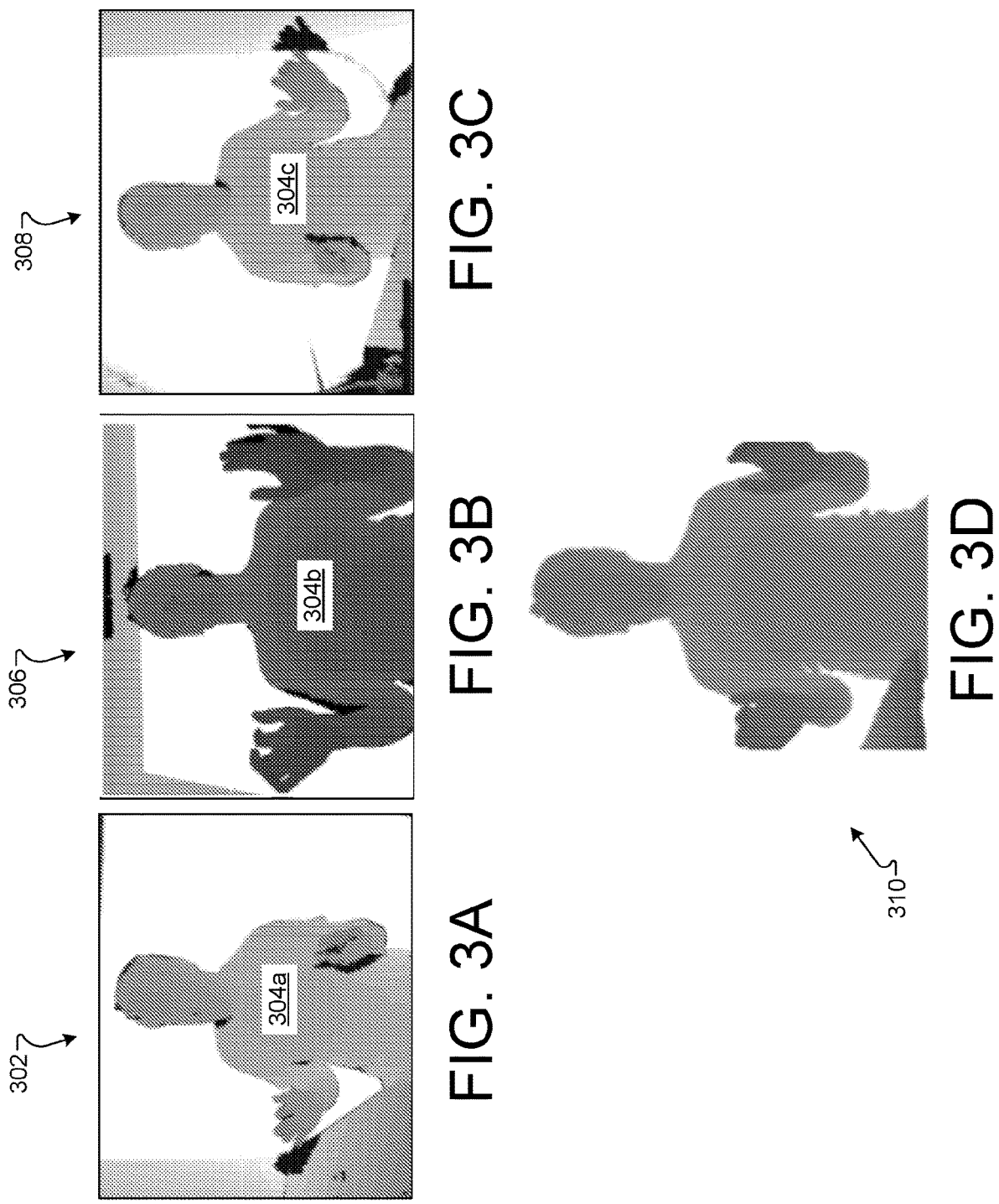
FIGS. 3A-3D depict examples of using sender-side geometric fusion to synthesize a novel image, according to implementations described throughout this disclosure.

FIGS. 3A-3D depict examples of using sender-side geometric fusion to synthesize a novel image, according to implementations described throughout this disclosure. FIG. 3A includes a depth map 302 of a view 304a of a user. The depth map 302 represents a depth image of a seated user from a first oblique viewpoint. FIG. 3B includes a depth map 306 of a view 304b of the same seated user. The depth map 306 is a depth image of the seated user from a straight angle viewpoint. FIG. 3C is a depth map 308 of a view 304c of the same seated user. The depth map 308 is a depth image of the seated user from a second oblique viewpoint.

In depth maps 302, 306, and 308, depth values are shown in grayscale ranging from dark (indicating small depth values) to light (indicating large depth values). White color indicates background (essentially infinite depth). Black color indicates unknown or undefined depth (e.g., missing data, noise, etc.).

The system 200 may use depth maps 302, 306, and 308 to produce updated depth views (not shown) which may be used to generate a resulting depth image 310, as shown in FIG. 3D. For example, depth data from each of depth maps 302, 306, and 308 may be used to generate a new (e.g., updated) depth view for each originally captured depth view. In some implementations, the updated depth views represent merged information from a number of depth views (e.g., views 302, 306, and 308). In some implementations, the updated depth views include depth information from a number of depth views in which particularly low quality depth data is determined and removed. The updated depth views can be used to generate (e.g., synthesize) the final depth image 310.

The depth image 310 may be generated from a specified viewpoint. For example, the specified viewpoint for the fused depth image 310 is facing directly in front of the user. In some implementations, the ray casting approach described above may be used to generate the depth image 310 uses far fewer resources than previous volumetric-based techniques and may be performed in real time. This is useful in applications such as video conferencing.

Figure 4:
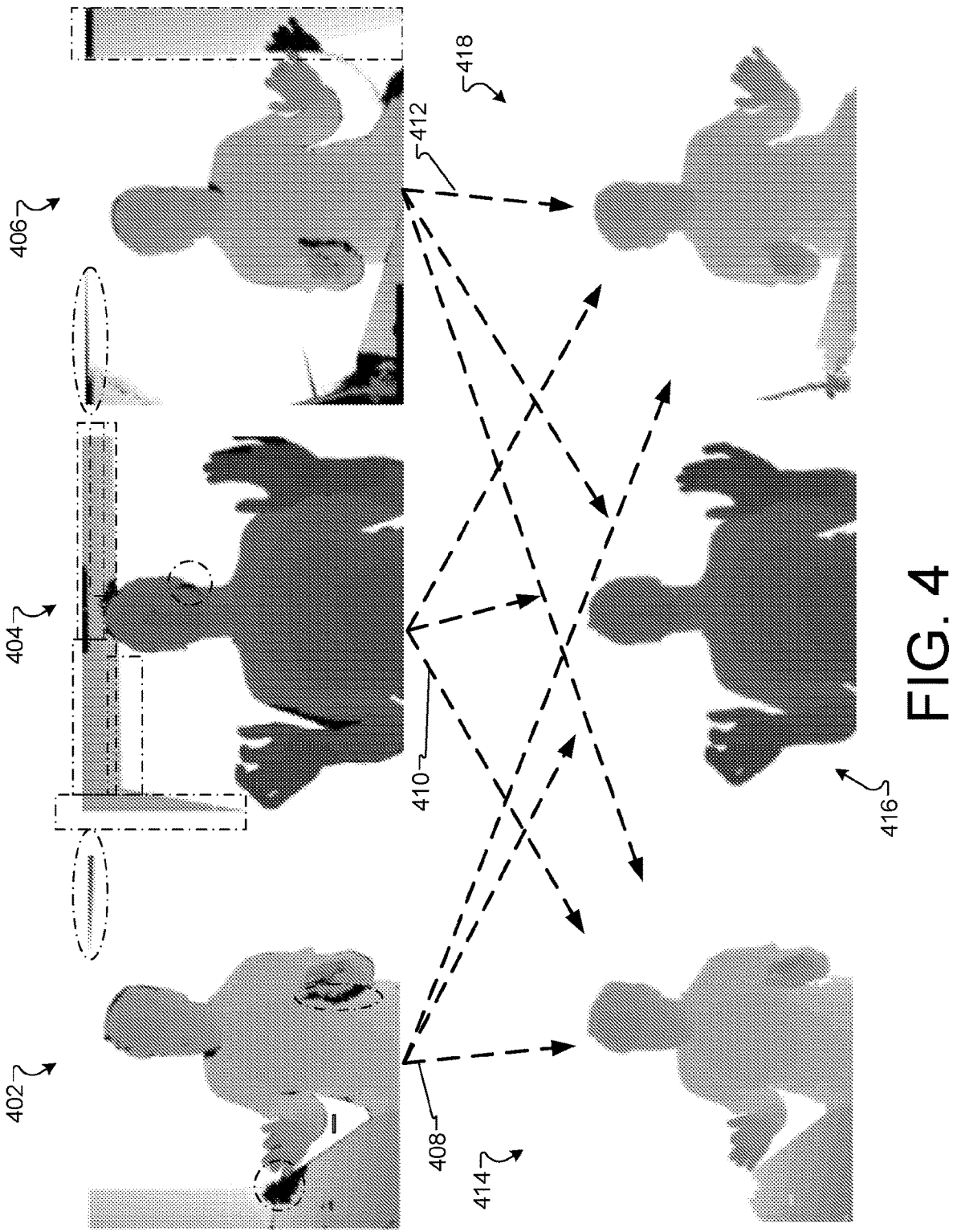
FIG. 4 depicts an example of using sender-side geometric fusion to synthesize regions of missing data, according to implementations described throughout this disclosure.

FIG. 4 depicts an example of using sender-side geometric fusion to synthesize regions of missing data, according to implementations described throughout this disclosure. Performing the sender-side geometric fusion may reduce the network bandwidth used to transmit an updated version of the originally captured depth views.

As shown in FIG. 4, a first input depth map 402 (e.g., representing a view of depth image 134(1)) is shown. The depth map 402 represents captured depth data. Similarly, a depth map 404 and a depth map 406 represent other depth views of, for example, depth images 134(2), and 134(N).

As shown, each of depth maps 402, 404, and 406 include noise (e.g., blur and lighting defects) and areas of missing data (e.g., dark shadows and black areas) due to the 3D depth estimation process performed on particular input images (e.g., 201). The dashed line shapes highlight some examples of such noise and missing data. In some implementations, missing data may be represented as black values in the input depth view shown by depth maps 402, 404, and 406. Moreover, this noise and missing data often varies temporally (i.e., from one time frame to the next), making it difficult to compress the depth data stream effectively.

Thus, to generate a new (e.g., novel) image using updated depth data, the system 200 may recompute depth views for each depth map that takes into account (e.g., combines)

depth data from other views, as indicated by arrow sets 408, 410, and 412. For example, a sender-side geometric fusion technique may be applied to depth maps 402, 404, and 406 to generate updated depth maps/views as a replacement data source to the originally captured depth maps (e.g., depth maps 402, 404, and 406). The replacement depth maps (shown here as maps 414, 416, and 418) may be used to transmit the depth information for any of the views shown in depth maps 402, 404, and 406. In short, the replacement views 414-418 reduce the necessary bandwidth for trans-mitting the depth maps/data by applying the geometric fusion technique on the sender side to replace each original depth view by a recomputed depth view that incorporates information from the two or more other available depth views.

The process described above may provide the effect of reducing the bitrate of transmitting the depth views from a sender system (e.g., computing system) to a receiver client by merging information across the views so as to reduce the magnitude of noise and to fill-in the occluded regions, as shown in views 414, 416, and 418. Each updated depth view 414, 416, and 418 have corrected views without occluded regions and without the noise indicated in corresponding captured depth views 402, 404, and 406.

For example, as shown in the updated depth views 414, 416, and 418 (representing sender-side fused depth views), the regions of missing data (black in the upper row) have been filled in using data from the other views 402, 404, and 406. In addition, the magnitude of the noise is reduced in the updated depth views 414-418. In addition, temporal conti-nuity is improved, which may assist with particular com-pression schemes such as video codecs H.264, VP9, H.265, and AVI, just to name a few examples.

When the sender-side geometric fused (i.e., updated) depth views are received on the receiver system, the geo-metric fusion process may be performed again using the three received updated depth views in order to synthesize an image from a novel viewpoint, for example.

Figure 5:
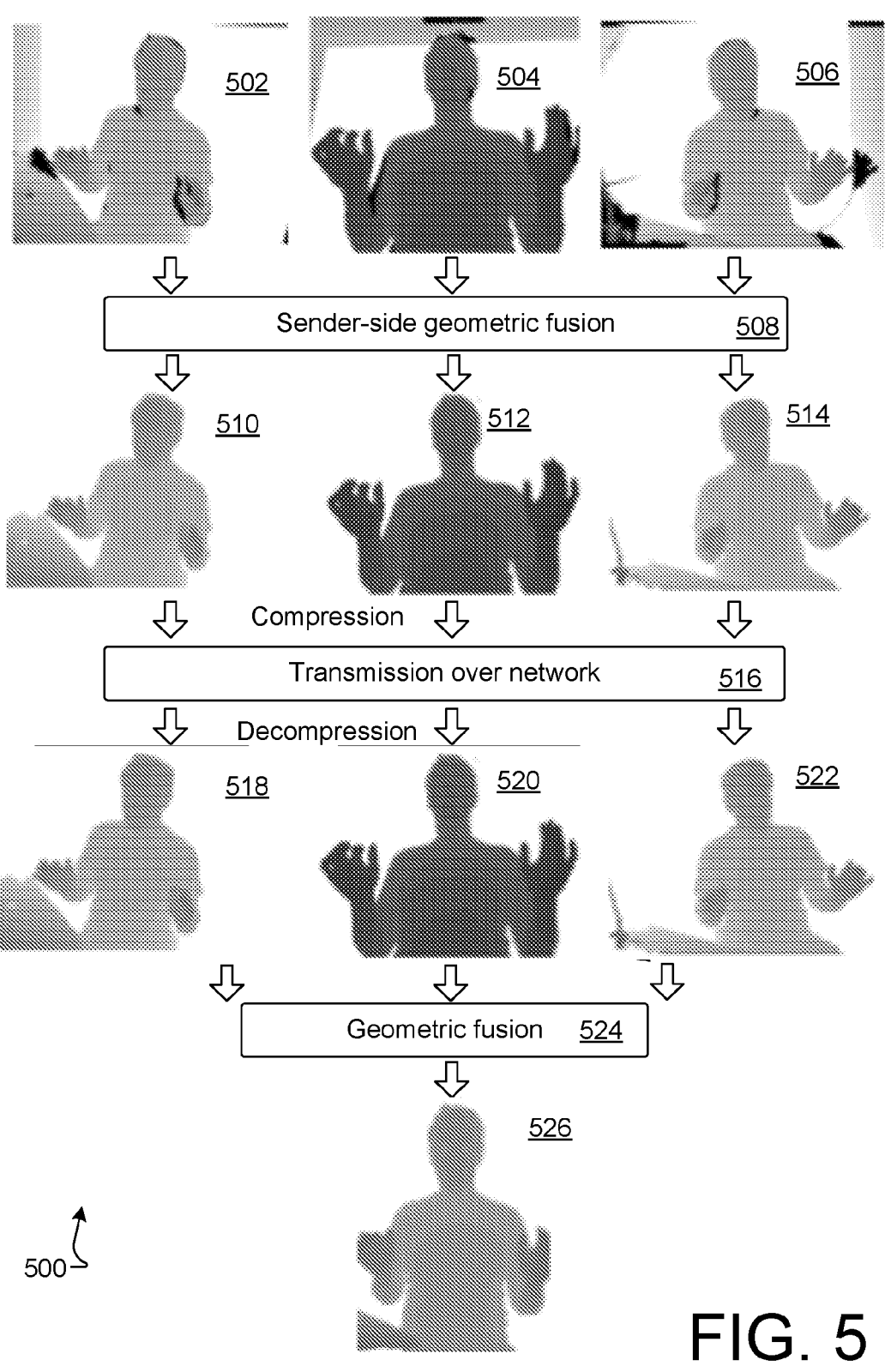
FIG. 5 is a block diagram of an example pipeline for synthesizing a novel image for rendering on a display device, according to implementations described throughout this disclosure.

FIG. 5 is a block diagram of an example pipeline 500 for synthesizing a novel image for rendering on a display device, according to implementations described throughout this disclosure. Here, three input depth views 502, 504, and 506 (e.g., similar to representations 134(1), 134(2), and 134(N)) may be captured by a system 202, for example, during a video conferencing session. The depth views may represent depth data and/or color data captured at a sender location. geometric fusion techniques 508 may be performed on each of the three depth views 134(1), 134(2), and 134(N)) in order to generate three respective updated depth views 510, 512, and 514. In general the sender-side geometric fusion techniques 508 may include an aggregation operation that combines portions of depth views from any number of captured depth views. The sender-side geometric fusion may result in an output of a plurality of updated depth views modified from the original received depth views where the modification improves the quality of the depth image data stored in a particular depth view with respect to using the depth views to later synthesize images representing objects in a particular depth view. The sender-side geometric fusion may perform aggregation operations to remove noise, com-plete missing data or occluded image portions, improve data compression, and improve temporal coherence, just to name a few examples.

Upon completing the fusion 508, the updated depth views 510, 512, and 514 may be compressed and transmitted 516 over a network. For example, the 3D system 202A may transmit the compressed depth views 510, 512, and 514 to a 3D system 202B. The 3D system 202B may decompress the received depth views to utilize such views when rendering content on a display, for example. In particular, system 202B may use the decompressed depth views 518, 520, and 522 to generate a final rendered view 526 by performing another geometric fusion 524.

For example, on the receiver system (e.g., system 202B), a geometric fusion is performed using the three received depth views 518, 520, and 522, to again synthesize a novel view of the user, shown in view 526. Thus, the geometric fusion technique is applied twice—once to each input depth view (on the sender-side) before transmission, and once to the final output view when merging the received (sender-side-fused) depth views. The geometric fusion generates a smoother, more complete coverage of the surface of the original depth view of the object than do conventional systems.

In some implementations, the image processing system is system 214 or system 202, either of which may be one side of a telepresence system configured to use the updated views and/or a resulting generated depth image to synthesize images from a plurality of target viewpoints. For example, the telepresence system operating on system 214 or system 202 may generate novel images of a user in real time using previously captured and modified depth views of the user. Thus, the target viewpoint may be selected to synthesize a previously uncaptured image of the user (e.g., or other object in a scene).

In some implementations, the geometric fusion is an aggregation operation performed using all received depth views to generate the updated depth views and such an operation may be being performed as a pre-process respon-sive to a request to transmit the plurality of depth views over a network. The pre-process may include image and/or video compression of each updated depth view.

FIG. 6 is a flow chart diagramming one example of a process 600 to perform sender-side geometric fusion for generating image content, according to implementations described throughout this disclosure. In short, the process 600 may provide an example of modifying captured depth images to generate novel views of objects (e.g., previously uncaptured by a camera). For example, the process 600 utilizes the systems and algorithms described herein to perform depth view aggregation operations in order to generate particular images from particular viewpoints. In general, the described process 600 may be performed on image content, video content, virtual content, UI elements, application content, or other camera-captured content.

In general, the systems 100, 200, and/or 700 may be used in the description and execution of process 600. Each of systems 100, 200, and/or 700 may, in some implementa-tions, represent a single system. In some implementations, the telepresence systems described in systems 202 may perform the operations of the claims. In some implementa-tions, the system 214 accessed via systems 202 may instead perform the operations of the claims. The process 600 is a computer-implemented method utilizing an image process-ing system (e.g., system 214 or 3D system 202) with at least one processing device to perform operations At block 602, the process 600 includes receiving a plu-rality of depth views of an object. For example, system 214 may capture, receive, or otherwise obtain input images 201, which may include depth views 134 (e.g., including depth images/maps 134(1) . . . 134(N) corresponding to depth maps 302, 306, and 308). Each of the plurality of depth views 134 may be captured from a respective viewpoint of the object (e.g., user). Each of the plurality of depth views may include respective depth data associated with one depth image of the object captured from the respective viewpoint. For example, the first depth view 304a shown in depth map 302 may be associated with a depth image 134(1). In some implementations, the first depth view may also be associated with a color image 227(1). In general, the first depth view corresponds to an actual captured input image 201 captured by an onboard camera, for example.

At block 604, the process 600 includes performing an aggregation operation on the plurality of depth views 134. The aggregation operation may include performing a sender-side geometric fusion on the depth views 134, as described throughout this disclosure. The plurality of depth views 134 may represent a plurality of depth maps (e.g., 302, 306, and 308) corresponding to captured images 201 of the object, which correspond to depth images 134(1) . . . 134(N).

In some implementations, the aggregation operation may include at least generating an updated depth view 138 corresponding with each of the plurality of depth views 134 (e.g., views 304a, 304b, and 304c), as shown at block 606. Each updated depth view 138 may be based at least in part on the respective viewpoint that the original depth view was captured from. The updated depth view 138 for each depth view 134 may represent portions of the respective depth data (e.g., from images 134(1) . . . 134(N) represented by depth maps 302, 306, and 308) from each of the remaining of the plurality of depth views 138. For example, the portions of other depth data from other images of the same object may include other angles (e.g., poses, viewpoints, etc.) of the object, other lighting of the object, or other information determined by system 214 (or system 202) to pertain to depth data about the object.

In some implementations, the process 600 includes replacing each of the plurality of depth views 134 with the corresponding updated depth views 138, as shown at block 608. For example, the plurality of depth views 134 may represent a plurality of depth maps (e.g., 302, 306, and 308) and the system 214 may generate and replace the plurality of depth maps 302, 306, and 308 with the updated depth maps (as shown by depth views 414, 416, and 418 of FIG. 4) upon completing the sender-side geometric fusion (e.g., aggregation operation).

In some implementations, the aggregation operation (e.g., replacement of depth views) may be performed to improve the temporal coherence of the generated depth image of the object from the target viewpoint. The updated depth views include more information than any one of the single captured depth views. Thus, the aggregation operation may be performed to smooth particular resulting images that utilize the updated depth views because such images may be generated with more information, higher quality information, and/or information that meets particular depth thresholds.

In some implementations, the aggregation operation may be performed in order to generate missing (or occluded) data associated with at least one of the received plurality of depth views of the object. For example, depth view shown in depth map 308 may be missing a left side of the user's face because the angle of capture of the original depth view is from the right side of the user's face. Therefore, system 214 can use the aggregation operation to utilize image data of the left side of the face from depth map 302, for example, to geometrically merge depth view information in order to generate missing data which may represent occluded regions in one or more of the other depth maps/depth views available to system 214.

Occluded regions may occur in systems such as system 200 (e.g., a stereo-based depth-inferring system), for example, when a depth image is computed from two relatively close images (e.g., 15 cm apart) using a stereo algorithm. The depth image created by the stereo algorithm is computed with respect to one of those two captured images. The stereo algorithm can fail when the surface is above an oblique angle threshold with respect to the two image sensors, or when the surface is visible by one of the two image sensors, but not visible by the other of the two image sensors. This visibility constraint may cause the occlusion problem.

In some implementations, the replacement of depth views may be performed to improve video compressibility (e.g., less storage space, faster speed, etc.) of depth views before sending such views over a network to a receiver system. In some implementations, the replacement of depth views (i.e., via the aggregation operation) may be performed to reduce noise associated with at least one of the received plurality of depth views of a particular object.

At block 610, the process 600 includes generating an image of the object from a target viewpoint based on the updated depth views. For example, the image 526 may be generated from a target viewpoint (e.g., a previously uncaptured viewpoint of the user shown in image 526). That is, the target viewpoint may be different from each of the respective viewpoints from which each of the plurality of depth views (e.g., shown by depth maps 302, 306, and 308) are captured.

In some implementations, the image processing system is system 214 or system 202, either of which may be one side of a telepresence system configured to use the updated depth views to synthesize images from a plurality of target viewpoints. For example, the telepresence system operating on system 214 or system 202 may generate novel images of a user in real time using previously captured and modified depth views of the user. Thus, the target viewpoint may be selected to synthesize a previously uncaptured image of the user (e.g., or other object in a scene).

Figure 7:
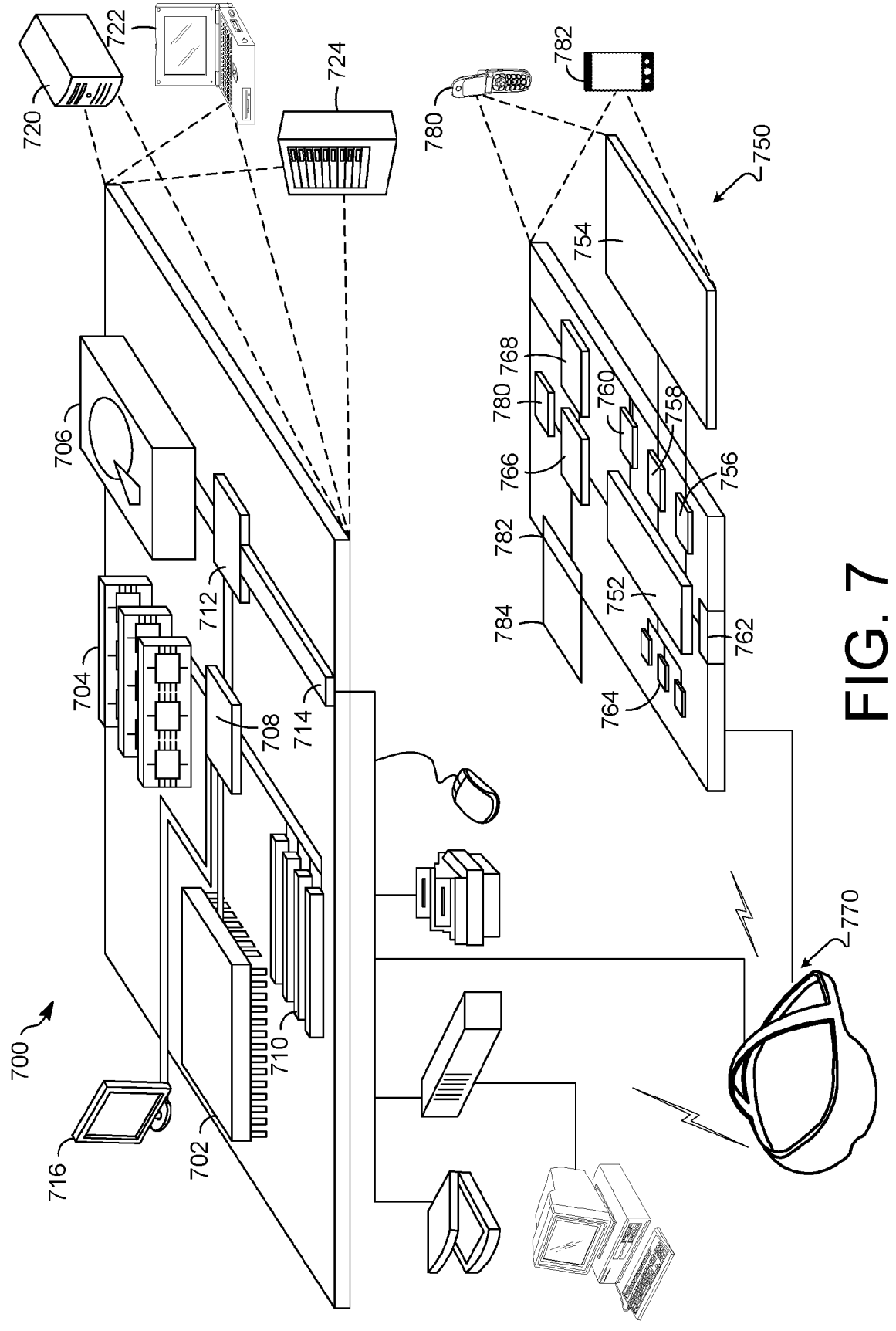
FIG. 7 shows an example of a computer device and a mobile computer device, which may be used with the techniques described herein.

FIG. 7 shows an example of a computer device 700 and a mobile computer device 750, which may be used with the described techniques. Computing device 700 can include a processor 702, memory 704, a storage device 706, a high-speed interface 708 connecting to memory 704 and high-speed expansion ports 710, and a low speed interface 712 connecting to low speed bus 714 and storage device 706. Components 702, 704, 706, 708, 710, and 712, are interconnected using various busses, and can be mounted on a common motherboard or in other manners as appropriate. Processor 702 can process instructions for execution within the computing device 700, including instructions stored in the memory 704 or on storage device 706 to display graphical information for a GUI on an external input/output device, such as display 716 coupled to high speed interface 708. In some embodiments, multiple processors and/or multiple buses can be used, as appropriate, along with multiple memories and types of memory. In addition, multiple computing devices 700 can be connected, with each device providing portions of the necessary operations (e.g., as a server bank, a group of blade servers, or a multi-processor system).

Memory 704 stores information within computing device 700. In one embodiment, memory 704 is a volatile memory unit or units. In another embodiment, memory 704 is a non-volatile memory unit or units. Memory 704 may also be another form of computer-readable medium, such as a magnetic or optical disk.

Storage device 706 can provide mass storage for the computing device 700. In one embodiment, storage device 706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer- or machine-readable medium, such as memory 704, storage device 706, or memory on processor 702.

High speed controller 708 manages bandwidth-intensive operations for computing device 700, while low speed controller 712 manages lower bandwidth-intensive operations. Such allocation of functions is exemplary only. In one embodiment, high-speed controller 708 is coupled to memory 704, display 716 (e.g., through a graphics processor or accelerator), and to high-speed expansion ports 710, which may accept various expansion cards (not shown). Low-speed controller 712 can be coupled to storage device 706 and low-speed expansion port 714. The low-speed expansion port, which may include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

Computing device 700 can be implemented in a number of different forms, as shown in the figure. For example, it can be implemented as a standard server 720, or multiple times in a group of such servers. It can also be implemented as part of a rack server system 724. In addition, it can be implemented in a personal computer such as a laptop computer 722. Alternatively, components from computing device 700 can be combined with other components in a mobile device (not shown), such as device 750. Each of such devices may contain one or more of computing device 700, 750, and an entire system may be made up of multiple computing devices 700, 750 communicating with each other.

Computing device 750 includes processor 752, memory 764, an input/output device such as display 754, communication interface 766, and transceiver 768, among other components. Device 750 may also be provided with a storage device, such as a microdrive or other device, to provide additional storage. Each of components 750, 752, 764, 754, 766, and 768, are interconnected using various buses, and several of the components may be mounted on a common motherboard or in other manners as appropriate.

Processor 752 can execute instructions within the computing device 750, including instructions stored in memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to display 754. Display 754 may be, for example, a TFT LCD (Thin-Film-Transistor Liquid Crystal Display) or an OLED (Organic Light Emitting Diode) display, or other appropriate display technology. Display interface 756 may comprise appropriate circuitry for driving display 754 to present graphical and other information to a user. Control interface 758 may receive commands from a user and convert them for submission to processor 752. In addition, external interface 762 may communicate with processor 752, so as to enable near area communication of device 750 with other devices. External interface 762 can provide, for example, for wired or wireless communication in some embodiments multiple interfaces can be used.

Memory 764 stores information within computing device 750. Memory 764 can be implemented as one or more of a computer-readable medium or media, a volatile memory unit or units, or a non-volatile memory unit or units. Expansion memory 784 may also be provided and connected to device 750 through expansion interface 782, which may include, for example, a SIMM (Single In Line Memory Module) card interface. Such expansion memory 784 may provide extra storage space for device 750, or may also store applications or other information for device 750. Specifically, expansion memory 784 may include instructions to carry out or supplement the processes described above, and may include secure information also. Thus, for example, expansion memory 784 can be a security module for device 750, and can be programmed with instructions that permit secure use of device 750. In addition, secure applications may be provided via the SIMM cards, along with additional information, such as placing identifying information on the SIMM card in a non-hackable manner.

The memory can include, for example, flash memory and/or NVRAM memory, as discussed below. In one embodiment, a computer program product is tangibly embodied in an information carrier. The computer program product contains instructions that, when executed, perform one or more methods, such as those described above. The information carrier is a computer- or machine-readable medium, such as the memory 764, expansion memory 784, or memory on processor 752 that may be received, for example, over transceiver 768 or external interface 762.

Device 750 can communicate wirelessly through communication interface 766, which can include digital signal processing circuitry where necessary. Communication interface 766 can provide communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 768. In addition, short-range communication can occur, such as using a Bluetooth, Wi-Fi, or other such transceiver (not shown). In addition, GPS (Global Positioning System) receiver module 780 can provide additional navigation- and location-related wireless data to device 750, which can be used as appropriate by applications running on device 750.

Device 750 can also communicate audibly using audio codec 760, which may receive spoken information from a user and convert it to usable digital information. Audio codec 760 may likewise generate audible sounds for a user, such as through a speaker, e.g., in a handset of device 750. Such sound can include sound from voice telephone calls, can include recorded sound (e.g., voice messages, music files, etc.) and can also include sound generated by applications operating on device 750.

Computing device 750 can be implemented in a number of different forms, as shown in the figure. For example, it can be implemented as cellular telephone 780. It can also be implemented as part of smart phone 782, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some embodiments, the computing devices depicted in FIG. 7 can include sensors that interface with a virtual reality or headset (VR headset/AR headset/HMD device 790). For example, one or more sensors included on computing device 750 or other computing device depicted in FIG. 7, can provide input to AR/VR headset 790 or in general, provide input to an AR/VR space. The sensors can include, but are not limited to, a touchscreen, accelerometers, gyroscopes, pressure sensors, biometric sensors, temperature sensors, humidity sensors, and ambient light sensors. Computing device 750 can use the sensors to determine an absolute position and/or a detected rotation of the computing device in the AR/VR space that can then be used as input to the AR/VR space. For example, computing device 750 may be incorporated into the AR/VR space as a virtual object, such as a controller, a laser pointer, a keyboard, a weapon, etc. Positioning of the computing device/virtual object by the user when incorporated into the AR/VR space can allow the user to position the computing device to view the virtual object in certain manners in the AR/VR space.

In some embodiments, one or more input devices included on, or connect to, the computing device 750 can be used as input to the AR/VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the AR/VR space can cause a particular action to occur in the AR/VR space.

In some embodiments, one or more output devices included on the computing device 750 can provide output and/or feedback to a user of the AR/VR headset 790 in the AR/VR space. The output and feedback can be visual, tactical, or audio. The output and/or feedback can include, but is not limited to, rendering the AR/VR space or the virtual environment, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some embodiments, computing device 750 can be placed within AR/VR headset 790 to create an AR/VR system. AR/VR headset 790 can include one or more positioning elements that allow for the placement of computing device 750, such as smart phone 782, in the appropriate position within AR/VR headset 790. In such embodiments, the display of smart phone 782 can render stereoscopic images representing the AR/VR space or virtual environment.

In some embodiments, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the AR/VR space. As just one example, computing device can be a laser pointer. In such an example, computing device 750 appears as a virtual laser pointer in the computer-generated, 3D environment. As the user manipulates computing device 750, the user in the AR/VR space sees movement of the laser pointer. The user receives feedback from interactions with the computing device 750 in the AR/VR environment on the computing device 750 or on the AR/VR headset 790.

In some embodiments, a computing device 750 may include a touchscreen. For example, a user can interact with the touchscreen in a particular manner that can mimic what happens on the touchscreen with what happens in the AR/VR space. For example, a user may use a pinching-type motion to zoom content displayed on the touchscreen. This pinching-type motion on the touchscreen can cause information provided in the AR/VR space to be zoomed. In another example, the computing device may be rendered as a virtual book in a computer-generated, 3D environment. In the AR/VR space, the pages of the book can be displayed in the AR/VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some embodiments, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR/VR space to control objects in the AR/VR space.

Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit the disclosed embodiments.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method utilizing an image processing system with at least one processing device to perform operations including:

receiving a plurality of depth views of an object, each of the plurality of depth views being captured from a respective viewpoint of the object, each of the plurality of depth views including respective depth data associated with a depth image of the object captured from the respective viewpoint, generating an updated depth view corresponding with each of the plurality of depth views, each updated depth view being based on the respective viewpoint, and representing portions of the respective depth data from each of remaining of the plurality of depth views of the object, at least a portion of the depth data in the updated depth view being geometrically fused and corresponding with an occluded region in at least one of the plurality of depth views; and generating an image of the object from a target viewpoint based on the updated depth views, the target viewpoint being different from each of the respective viewpoints from which each of the plurality of depth views are captured.

2. The computer-implemented method of claim 1, wherein the generating the updated depth view is included in an aggregation operation that result in a reduction of noise associated with at least one of the plurality of depth views of the object.

3. The computer-implemented method of claim 1, wherein:

the generating the updated depth view is performed as a pre-process responsive to a request to transmit the plurality of depth views over a network; and the pre-process further includes video compression of each updated depth view.

4. The computer-implemented method of claim 1, wherein the target viewpoint is selected to synthesize a previously uncaptured image of the object.

5. The computer-implemented method of claim 1, wherein the image processing system is a telepresence system configured to use the updated depth views to synthesize images from a plurality of target viewpoints.

6. The computer-implemented method of claim 1, wherein:

the plurality of depth views represent a plurality of depth maps corresponding to captured images of the object; and generating and replacing the plurality of depth maps with updated depth maps improves a temporal coherence of the generated depth image of the object from the target viewpoint.

7. The computer-implemented method of claim 1, wherein generating the updated depth view includes geometrically fusing a corresponding depth view and two or more depth views of the plurality of depth views different from the corresponding depth view.

8. The computer-implemented method of claim 7, wherein less preference in the geometric fusing is given to an oblique view of the object from the two or more depth views than a direct view of the object from the two or more depth views.

9. The computer-implemented method of claim 1, wherein the at least the portion of the depth data in the updated depth view is geometrically fused on a sender-side device.

10. An image processing system comprising:

at least one processing device; and a memory storing instructions that when executed cause the system to perform operations including:

receiving a plurality of depth views of an object, each of the plurality of depth views being captured from a respective viewpoint of the object, each of the plurality of depth views including respective depth data associated with a depth image of the object captured from the respective viewpoint, generating an updated depth view corresponding with each of the plurality of depth views, each updated depth view being based on the respective viewpoint, and representing portions of the respective depth data from each of remaining of the plurality of depth views of the object, at least a portion of the depth data in the updated depth view being geometrically merged and corresponding with an occluded region in at least one of the plurality of depth views; and generating an image of the object from a target viewpoint based on the updated depth views, the target viewpoint being different from each of the respective viewpoint from which each of the plurality of depth views are captured.

11. The image processing system of claim 10, wherein:

the generating the updated depth view is performed as a pre-process responsive to a request to transmit the plurality of depth views over a network; and the pre-process further includes video compression of each updated depth view.

12. The image processing system of claim 10, wherein the target viewpoint is selected to synthesize a previously uncaptured image of the object.

13. The image processing system of claim 10, wherein the image processing system is a telepresence system configured to use the updated depth views to synthesize images from a plurality of target viewpoints.

14. The image processing system of claim 10, wherein:

the plurality of depth views represent a plurality of depth maps corresponding to captured images of the object; and generating and replacing the plurality of depth maps with updated depth maps improves a temporal coherence of the generated depth image of the object from the target viewpoint.

15. A non-transitory, machine-readable medium having instructions stored thereon, the instructions, when executed by a processor, cause a computing device to:

receive a plurality of depth views of an object, each of the plurality of depth views being captured from a respective viewpoint of the object, each of the plurality of depth views including respective depth data associated with a depth image of the object captured from the respective viewpoint, generate an updated depth view corresponding with each of the plurality of depth views, each updated depth view being based on the respective viewpoint, and representing portions of the respective depth data from each of remaining of the plurality of depth views of the object, at least a portion of the depth data in the updated depth view being geometrically merged and corresponding with an occluded region in at least one of the plurality of depth views; and generate an image of the object from a target viewpoint based on the updated depth views, the target viewpoint being different from each of the respective viewpoints from which each of the plurality of depth views are captured.

16. The non-transitory, machine-readable medium of claim 15, wherein the generating the updated depth view is included in an aggregation operation that result in a reduction of noise associated with at least one of the plurality of depth views of the object.

17. The non-transitory, machine-readable medium of claim 15, wherein:

the generating the updated depth view is being performed as a pre-process responsive to a request to transmit the plurality of depth views over a network; and the pre-process further includes video compression of each updated depth view.

18. The non-transitory, machine-readable medium of claim 15, wherein the depth views are generated by a telepresence system configured to use the updated depth views to synthesize images from a plurality of target viewpoints.

19. The non-transitory, machine-readable medium of claim 15, wherein:

the plurality of depth views represent a plurality of depth maps corresponding to captured images of the object; and generating and replacing the plurality of depth maps with updated depth maps improves a temporal coherence of the generated depth image of the object from the target viewpoint.

\*  \*  \*  \*  \*